(12) United States Patent
Bastiaansen et al.

(10) Patent No.: US 6,996,296 B2
(45) Date of Patent: Feb. 7, 2006

(54) POLARIZING DEVICE

(75) Inventors: Cees Bastiaansen, Montfort (NL); Theodorus Tervoort, Zurich (NL); Natalie Stutzmann, Zurich (NL)

(73) Assignee: Eidgenossische Technische Hochschule Zurich, Zurich (CH)

( * ) Notice: Subject to any disclaimer, the term of this patent is extended or adjusted under 35 U.S.C. 154(b) by 476 days.

(21) Appl. No.: 10/198,076

(22) Filed: Jul. 19, 2002

(65) Prior Publication Data

US 2003/0058386 A1 Mar. 27, 2003

Related U.S. Application Data

(63) Continuation of application No. PCT/US01/01819, filed on Jan. 19, 2001.

(60) Provisional application No. 60/176,619, filed on Jan. 19, 2000.

(51) Int. Cl.
- G02B 6/00 (2006.01)
- G02F 1/1335 (2006.01)
- A47F 3/00 (2006.01)
- B29D 11/00 (2006.01)

(52) U.S. Cl. .............. 385/11; 385/14; 385/37; 385/129; 385/130; 385/131; 385/901; 349/97; 349/96; 362/559; 362/561; 264/478; 264/1.31

(58) Field of Classification Search ............. 385/147, 385/901, 11, 88, 115, 116, 14, 129, 130, 131, 385/132, 37; 349/97, 96; 362/559, 561; 264/478, 1.31

See application file for complete search history.

(56) References Cited

U.S. PATENT DOCUMENTS

| 4,212,048 A | 7/1980 | Castleberry ............... 362/19 |
| 5,485,229 A | 1/1996 | Hare ....................... 351/215 |
| 5,729,311 A | 3/1998 | Broer et al. .............. 349/65 |
| 5,845,035 A | 12/1998 | Wimberger-Friedl ....... 385/129 |

(Continued)

FOREIGN PATENT DOCUMENTS

| EP | 770818 | 5/1997 |
| GB | 2331615 | 5/1999 |
| WO | 97 01726 | 1/1997 |
| WO | 97 41484 | 11/1997 |

(Continued)

Primary Examiner—Brian M. Healy
(74) Attorney, Agent, or Firm—Mayer Brown Rowe & Maw LLP

(57) ABSTRACT

The present invention provides polarizing devices and illumination devices that include the polarizing devices. The polarizing devices and illumination devices can be advantageously used in a wide variety of applications, such as in liquid crystal displays. Polarizing devices provided by the present invention include those having an isotropic waveguiding layer with a refractive index $n_i$ and an anisotropic separating layer having an anisotropic region with principal refractive indices $n_x$ and $n_y$, wherein $n_x > n_y$ and wherein $n_i$ is substantially smaller than $n_x$ and substantially larger than $n_y$. An example of a further polarizing device provided by the present invention is one having a waveguiding layer and a separating layer, wherein the separating layer includes a form birefringent region.

39 Claims, 11 Drawing Sheets

U.S. PATENT DOCUMENTS

| | | | |
|---|---|---|---|
| 6,020,944 A | 2/2000 | Hoshi | 349/62 |
| 6,650,472 B1 * | 11/2003 | Adachi et al. | 359/453 |
| 6,750,996 B2 * | 6/2004 | Jagt et al. | 359/34 |
| 6,774,960 B2 * | 8/2004 | Cornelissen et al. | 349/65 |
| 6,795,244 B2 | 9/2004 | Jagt et al. | 359/494 |
| 6,920,272 B2 * | 7/2005 | Wang | 385/129 |
| 2003/0058383 A1 | 3/2003 | Jagt et al. | 349/65 |
| 2003/0067760 A1 | 4/2003 | Jagt et al. | 362/81 |
| 2003/0099037 A1 | 5/2003 | Jagt et al. | 359/488 |
| 2004/0105617 A1 | 6/2004 | Cornelissen et al. | 359/488 |

FOREIGN PATENT DOCUMENTS

| | | |
|---|---|---|
| WO | 99 22268 | 5/1999 |

* cited by examiner

POLARIZING DEVICE

CROSS REFERENCE TO RELATED APPLICATIONS

This Application is a continuation of PCT Application No. PCT/US01/01819 which was filed on Jan. 19, 2001, and claims the benefit of U.S. Provisional Application No. 60/176,619, which was filed on Jan. 19, 2000. Both prior Applications are hereby incorporated in their entirety by reference.

FIELD OF THE INVENTION

The invention relates to polarizing devices, illumination devices comprising such polarizing devices and methods for using and making the same. In particular, the invention relates to polarizing devices and illumination devices comprising such polarizing devices suitable for use in liquid crystal displays.

BACKGROUND OF THE INVENTION

A typical direct view LCD, which includes an illumination device, is discussed in U.S. Pat. No. 4,212,048. In the LCD discussed in this patent, a display is illuminated using an illumination device, which consists of a wedge-shaped transparent plate and a light source. The illumination device typically is equipped with a dichroic polarizing means to provide polarized light. A drawback of the polarized light illumination device discussed in U.S. Pat. No. 4,212,048 is that at least 50% of the light supplied by the light source is lost without being able to contribute to the formation of the image, because the polarizer absorbs the unwanted light component. Consequently, the power consumption of the display is high which limits the working time between battery replacements or battery charges. The brightness of the display is also adversely affected.

Several non-absorbing polarizing means for use in direct view displays have been developed which transmit one polarization direction of incident unpolarized light and reflect or scatter the other polarization direction of light. Several examples of such polarizers are disclosed, e.g., see PCT WO 97/41484. The reflected or scattered light is subsequently recycled through depolarization and re-direction, which enhances the efficiency of the process of conversion of unpolarized light into polarized light. The main disadvantages of these illumination devices are the high cost of the additional components such as the reflecting polarizing sheets, diffusers and quarter-wave foils and the complexity of the device.

An illumination device which attempts to address some of the above described disadvantages of direct view displays is disclosed in U.S. Pat. No. 5,587,816. Also here an expensive polarized light separating sheet is required which transmits one polarization direction of light and reflects the other, and several additional optical components are needed such as light out-coupling means and quarter-wave foils.

An illumination device which attempts to address some of the above described disadvantages is discussed in U.S. Pat. No. 5,845,035. This patent discloses a system that comprises two layers, i.e., an isotropic layer of refractive index $n_i$, and an anisotropic layer characterized by two refractive indices in perpendicular directions, respectively $n_e$ and $n_o$, where, dependent on the specific configuration, $n_i$ must be equal to $n_e$ or $n_o$. This illumination device, however, has several shortcomings. In one specific embodiment, the light is coupled into the anisotropic layer and such an anisotropic waveguide is difficult to manufacture. In a second and preferred embodiment, the light is coupled into the isotropic layer. Here, the isotropic refractive index of the waveguide needs to be identical to the highest refractive index of the anisotropic layer. In practice, polymers are required for the isotropic material with a refractive index between 1.65 and 2.00 if drawn PET or PEN films are used. Polymers with such a high isotropic refractive index are not available commercially and, in fact, their manufacturing is far from trivial.

It is an object of the present invention to provide a polarizing device for the use, for example, in illumination devices whereby commercial, low-cost polymers can be used for the production thereof.

It is a further object of the present invention to provide a polarizing device capable of transforming a substantial portion of unpolarized light emitted by a light source into polarized light.

It is a further object of the present invention to provide a polarizing device which comprises an isotropic waveguiding layer in which the light is coupled in and a birefringent, polarization separating layer.

Another object is to provide a polarizing device wherein the waveguiding layer is isotropic wherein the separating layer comprises an anisotropic film, and wherein the isotropic waveguiding layer has a refractive index between the refractive indices of the anisotropic region.

Another objective is to provide a polarizing device wherein a commercial and low cost polymer is used for the isotropic waveguiding layer.

In U.S. Pat. No. 5,845,035, an anisotropic, birefringent polarization separating layer is required comprising a layer with a well defined molecular orientation which is obtained, for instance, by producing a stretched PET or PEN film. In general, the production of such films is notoriously difficult and an extensive and highly optimized infrastructure is required for their production.

It is an object of the present invention is to provide a polarizing device wherein the separating layer comprises a form birefringent region.

It is yet another object of the invention to provide a polarizing device wherein the separating layer comprises a form birefringent region and also comprising a light coupling-out means.

It is yet another object of the invention to provide a method for making a polarizing device comprising a separating layer and a waveguiding layer.

Yet another object of the present invention is to provide a polarizing device comprising a separating layer and comprising a waveguiding layer where the two different parts can both be injection molded.

It is a further object of the present invention to provide a polarizing device comprising two parts, which can be produced from inexpensive, commercial materials which both can be injection molded.

Furthermore, it is an object of the invention to provide an illumination system comprising a polarizing device according to the invention.

Yet another object of the present invention is to provide a flat panel picture display comprising an illumination system comprising a polarizing device according to the invention.

SUMMARY OF THE INVENTION

The present invention provides a polarizing device comprising an isotropic waveguiding layer and comprising an anisotropic separating layer, wherein the isotropic layer has a refractive index between the refractive indices of the anisotropic layer.

The present invention further provides a polarizing device comprising an isotropic waveguiding layer and comprising an anisotropic separating layer, which comprises a stretched, oriented film, wherein the refractive index of the isotropic waveguiding layer is in between the ordinary and extraordinary refractive index of the stretched film.

Furthermore, the present invention provides a polarizing device comprising a waveguiding layer and comprising a separating layer, wherein the separating layer comprises a form birefringent region and an isotropic region, and wherein the isotropic waveguiding layer has a refractive index between or equal to one of the refractive indices of the form birefringent region of the separating layer. A method to make this device by forming the birefringent region through injection molding or embossing is also provided.

In addition, the present invention provides a polarizing device comprising an isotropic waveguiding layer and comprising a separating layer comprising an anisotropic region, wherein the separating layer comprises a light out-coupling means.

In addition, the present invention provides a polarizing device comprising an isotropic waveguiding layer and comprising a separating layer comprising an anisotropic region, wherein the separating layer comprises a light out-coupling means and wherein a further isotropic layer is provided on top of the light out-coupling means.

Also provided with the present invention is an illumination device comprising a polarizing device of the present invention.

Furthermore, a flat panel picture display comprising an illumination device comprising a polarizing device of the present invention is provided.

DETAILED DESCRIPTION OF THE INVENTION AND PREFERRED EMBODIMENTS

Figure 1:
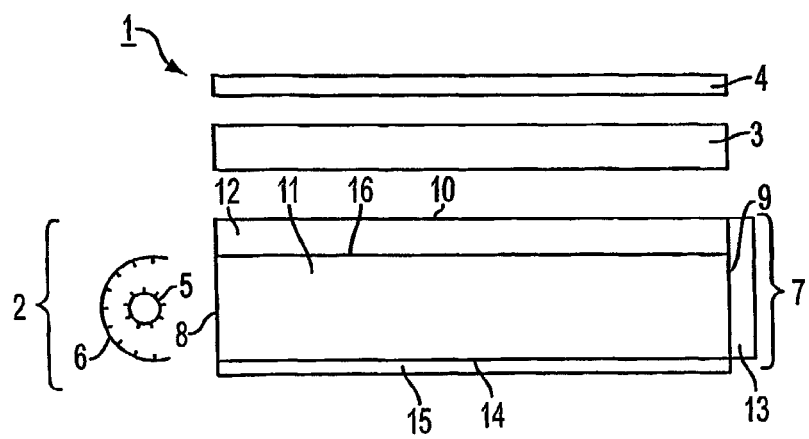
FIG. 1 shows a flat-panel picture display device according to the present invention.

Herein certain terms are used to define certain optical aspects. These terms are defined below.

Substantially equal refractive indices are refractive indices that differ not more than 0.01, preferably not more than 0.005.

Substantially different refractive indices are refractive indices that differ more than 0.01.

Substantially lower means more than 0.01 less, and substantially higher means more than 0.01 more.

Optically transparent refers to transparent to types of light provided by the light source that is designed for use with the polarization device of the present invention.

An illumination device is a polarizing device comprising a light source.

The present invention provides a polarizing device which comprises at least two layers, i.e. a waveguiding layer and a separating layer. The separating layer comprises a first optically anisotropic region. The first optically anisotropic region has two principal refractive indices $n_x$ and $n_y$ which are preferably in a plane parallel to the interface between the waveguiding layer and the separating layer, with $n_x > n_y$. Preferably, $n_x$ is the extraordinary refractive index and $n_y$ the ordinary refractive index of the first anisotropic region.

In an embodiment of the present invention, the waveguiding layer is an isotropic material and has a refractive index $n_i$. If the first anisotropic region of the separating layer is a form birefringent region, then $n_i$ has a value between $n_x$ and $n_y$, or is substantially equal to $n_x$. Preferably, $n_i$ is substantially equal to $n_x$.

Preferably, said form birefringent region is a form birefringent layer.

The separating layer comprising the form birefringent region may further comprise an isotropic region having a refractive index $n_s$, which is typically higher than $n_x$. Preferably, the isotropic region is of the same material as the form birefringent region.

If the first anisotropic region is not a form birefringent region, then $n_i$ has a value between the refractive indices $n_x$ and $n_y$. Preferably, $n_i$ is then substantially lower than $n_x$ and substantially higher than $n_y$. It is further preferred that the separating layer then consists of said first anisotropic region.

In another embodiment of the invention, the waveguiding layer comprises a second anisotropic region having principal refractive indices $n_a$ and $n_b$, with $n_a > n_b$, which are preferably in a plane parallel to the interface between the waveguiding layer and the separating layer. At least one of $n_a$ and $n_b$ is substantially different from $n_x$ and $n_y$. Preferably, principal refractive index $n_a$ has the same direction as either principal refractive index $n_x$ or principal refractive index $n_y$. More preferably, principal refractive index $n_a$ has the same direction as principal refractive index $n_x$. Preferably, $n_a$ is the extraordinary refractive index and $n_b$ the ordinary refractive index of the second anisotropic region. Although the second anisotropic region may be a form birefringent region, it is preferred that this anisotropic region is not a form birefringent region. Preferably, the waveguiding layer consists of the second anisotropic region.

In order for polarization to occur in this embodiment, one of refractive indices $n_a$ or $n_b$ must detect a lower refractive index in the first anisotropic region, whereas the other refractive index of $n_a$ or $n_b$ must detect a larger refractive index in the first anisotropic region. Preferably, one of the refractive indices $n_a$ or $n_b$ is smaller than $n_x$ and $n_y$, while the other refractive index of $n_a$ and $n_b$ is larger than $n_x$ and $n_y$.

If principal refractive index $n_a$ has the same direction as principal refractive index $n_x$, then $n_a$ is greater than $n_x$ if $n_b$ is smaller than $n_y$, whereas $n_b$ is higher than $n_y$ when $n_a$ is smaller than $n_x$.

If principal refractive index $n_a$ has the same direction as principal refractive index $n_y$, then $n_a$ is greater than $n_y$ if $n_b$ is smaller than $n_x$, whereas $n_b$ is greater than $n_x$ if $n_a$ is smaller than $n_y$.

Light Source

The invention envisions a light source that couples light into the waveguiding layer of the polarizing device. This light may be coupled in from any suitable position. Any suitable light source may be used, e.g., a fluorescence lamp or one or more light emitting diodes. The light source may have any suitable shape, for instance a rod-like shape. Typically, the light provided comprises light in the visible region. In specific embodiments it is preferred that the light comprises UV light.

Preferably, the light is coupled-in on at least one end face of the waveguiding layer. Coupling-in the light at more than one end face may be done by using multiple light sources but also by one light source with multiple bends.

Reflectors

Preferably, a reflector is present at least one side face of the polarizing device at the opposite end of the light source. Additional reflectors can be added to the other side faces and to the waveguiding layer at the side opposite to the light exit layer. These later reflectors ensure that light emitted by the waveguiding layer in a direction away from the anisotropic separating layer is reflected.

An embodiment of the illumination device comprising the polarizing device according to the invention is characterized in that a reflector is arranged on at least one end face remote from a light source. Such a reflector may be implemented in any suitable way, for instance as a vapor-deposited thin film or as a foil. Furthermore, the reflector may be a depolarizing reflector.

End Faces as Collimator

The side faces of the waveguiding layer may be equipped with a collimator for coupling-in of highly collimated light. This can be done by any suitable means, such as by constituting the collimator by a lens.

Surface Structure

The polarizing device preferably has a separating layer comprising a means to couple-out light, such as a printed dot pattern or a relief structure. In the case of a surface structure, hereinafter also referred to as relief structure, such a structure aids in coupling light out of the separating layer and/or can also collimate the emitted light. This relief structure can also ensure that the light is homogeneously distributed over the exit surface. Furthermore, it is preferred that this relief structure is present on the surface of the separating layer that is facing away from the waveguiding layer.

As will be readily appreciated by an artisan, the efficiency of such a layer with respect to aiding in coupling light out and/or collimating light is dependent on the specific relief structure of the separating layer.

The structure may comprise, in particular for collimating purposes, an array of micro-prism, a microlens array or similar structures.

A relief structure may be established by any suitable means, e.g. by embossing or injection molding.

The surface structure may comprise a cross-section comprising a plurality of upwardly opening shapes, such as V-shape, defined by the surface of the separating layer.

The waveguiding layer can be a rectangular sheet or tapered and equipped with scatterers (either inside or as a printed dot pattern). Moreover, additional reflectors either depolarizing or not can be added to the waveguiding layer.

If the separating layer has a surface structure, an additional layer may be provided on top of said surface structure. Preferably, the surface of this layer that faces away from the surface structure is a flat surface.

Depolarization

In the polarizing device according to the present invention, one polarization direction of unpolarized light is directly transmitted and the other polarization direction of light is depolarized and recycled. This depolarization can be affected by a variety of means, such as scatterers in the waveguiding layer. Moreover, the waveguiding layer can be slightly optically anisotropic (birefringent) so that a continuous depolarization of the light occurs. Moreover, reflectors can be used which depolarize the light.

Extra Polarizer

An extra polarizer may be arranged on or proximate to the exit surface of the separating layer in order to further optimize the efficiency of polarization.

Materials

Any suitable anisotropic and isotropic materials may be used in the present invention both as waveguiding and separating layer. Isotropic materials, for instance, include acrylics, poly(methyl methacrylate) [PMMA], polystyrene (PS) and polycarbonate [PC]. PMMA and PC are particularly suitable as isotropic waveguiding layers.

Anisotropic materials based on drawn films include poly (ethylene terephtalate) [PET], poly(ethylene naphtalate) [PEN] and cyclic olefine polymer (COC). Materials comprising a form birefringent layer are preferentially PMMA, PS and PC.

Preferred anisotropic materials for the present invention based on stretched films include those that have an extraordinary refractive index $n_e$ between 1.45 and 2.0, more preferably between 1.45 and 1.87, even more preferably between 1.5 and 1.87, and most preferably between 1.65 and 1.87.

The ordinary refractive index $n_o$ of anisotropic materials used in the present invention is preferably between 1.4 and 1.8, more preferably between 1.5 and 1.7, and most preferably between 1.5 and 1.6.

Preferably $n_i$ is between 1.4 and 1.7, more preferably between 1.45 and 1.65 and most preferably between 1.48 and 1.6.

The material comprising a form birefringent layer may be an isotropic material comprising a sub-micron grating. Preferably, the sub-micron grating is present on the surface of this form birefringent material. If the form birefringent material is used as a separating layer, the sub-micron grating is preferably present on the side facing the waveguiding layer.

The isotropic refractive index of the material comprising a form birefringent layer is preferentially higher than 1.3 more preferentially higher than 1.45 and most preferably higher than 1.55.

The refractive index $n_x$ of the form birefringent layer is preferentially between 1.3 and 1.6 and more preferentially between 1.45 and 1.59 and most preferably between 1.52 and 1.57.

The refractive index $n_y$ of the form birefringent layer is preferentially between 1.2 and 1.6 and more preferentially between 1.35 and 1.55 and most preferably between 1.4 and 1.5.

This grating can be established by any suitable means, e.g. by embossing the isotropic material, or by injection molding using a mold comprising a sub-micron grating.

Preferably, the grating period is between 20 nm and 1000 nm, more preferably between 50 nm and 800 nm, and most preferably between 50 nm and 200 nm.

Preferably the pitch height of the grating is more than 20 nm, more preferably more than 50 nm, even more preferably more than 200 nm, and most preferably more than 500 nm.

LCD's

Liquid crystalline display panels generally comprise transmissive, reflective and transflective panels. In order to extend the lifetime of the batteries used in such panels or to enhance their brightness, it is preferred to use illumination systems that convert a large part of the light emitted by the light source into polarized light. The illumination device comprising a polarizing device according to the present invention may be implemented in any suitable illumination system, for instance, in an illumination system for flat panel liquid crystal displays. The liquid crystal display may be any suitable liquid crystal display, e.g. a liquid crystal display based on the twisted nematic effect, the supertwisted nematic effect, the ferro-electric effect, vertically aligned liquid crystals effects, electrically controlled birefringence effects etc.

The liquid crystal display panel may comprise a transmittive, a transflective or a reflective display. Furthermore, the liquid crystal display may be a non-color display or a color display. In the case of a color display, it may also comprise a color filter.

A flat panel picture display 1 comprising an illumination device 2 comprising a polarizing device according to present invention 7 is shown in FIG. 1.

In order that the illumination device 2 provides polarized light, the polarizing device 7 is constituted by at least two layers, i.e. by at least a waveguiding layer 11 and a separating layer 12.

The separating layer 12 comprises a first optically anisotropic region. The first optically anisotropic region has two principal refractive indices $n_x$ and $n_y$ in a plane parallel to the interface 16 between the waveguiding layer 11 and the separating layer 12, with $n_x > n_y$. Preferably, $n_x$ is the extraordinary refractive index and $n_y$ the ordinary refractive index of the first anisotropic region.

Figure 4:
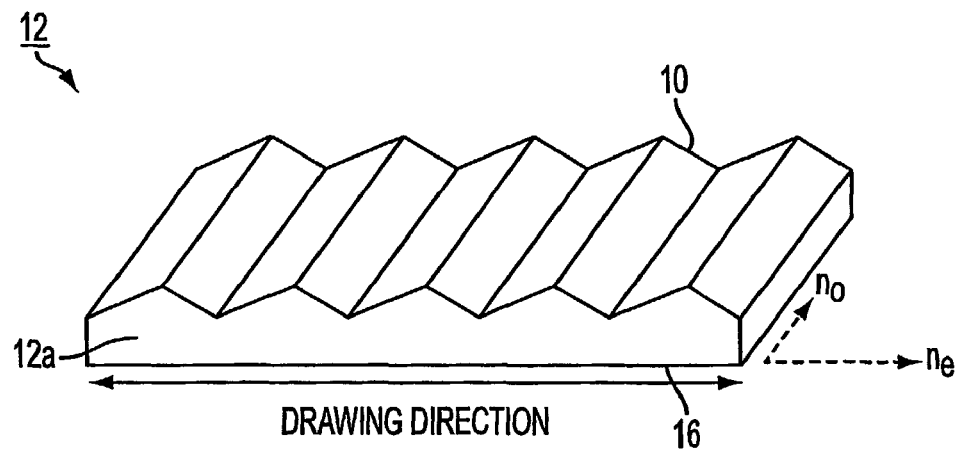
FIG. 4 shows a separating layer of a polarizing device according to the present invention based on an oriented film comprising a relief structure.
Figure 5:
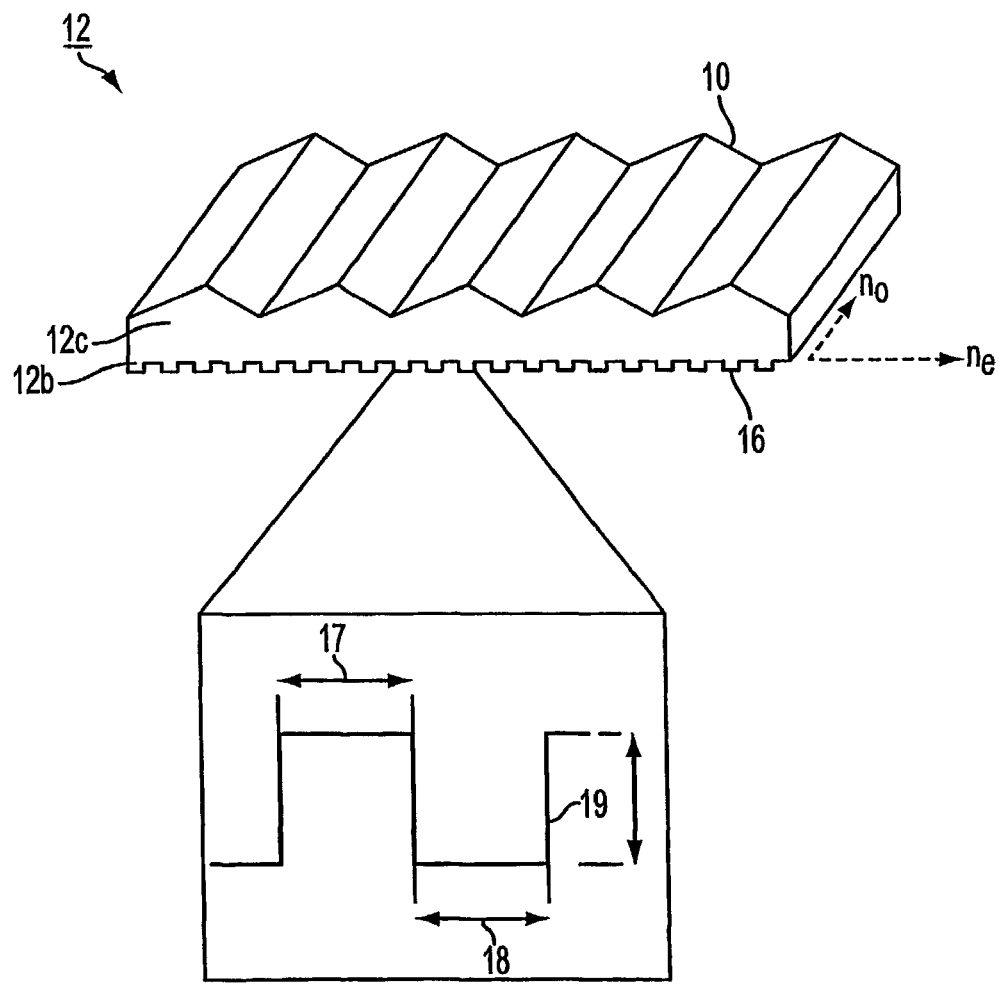
FIG. 5 shows a separating layer of a polarizing device according to the present invention comprising a form birefringent region. The inset shows an enlargement of the form birefringent region.

In an embodiment of the present invention, the waveguiding layer 11 is of an isotropic material and has a refractive index $n_i$ and the separating layer 12 comprises a first anisotropic region based on a form birefringent region 12b, as shown in FIG. 5. The separating layer 12 comprising the form birefringent region may further comprise an isotropic region 12c having a refractive index $n_s$, which is preferably higher than $n_x$. Preferably, the isotropic region is of the same material as the form birefringent region. In another embodiment of the present invention, the first anisotropic region is not a form birefringent region. It is then preferred that the separating layer 12 consists of said first anisotropic region 12a, such as an oriented film as shown in FIG. 4.

In another embodiment of the invention, the waveguiding layer 11 comprises a second anisotropic region having principal refractive indices $n_a$ and $n_b$, with $n_a > n_b$. At least one of $n_a$ and $n_b$ is substantially different from nx and ny. Preferably, $n_a$ is the extraordinary refractive index and $n_b$ the ordinary refractive index of the second anisotropic region. Although the second anisotropic region may be a form birefringent region, it is preferred that this anisotropic region is not a form birefringent region. Preferably, the waveguiding layer consists of the second anisotropic region.

Figure 2:
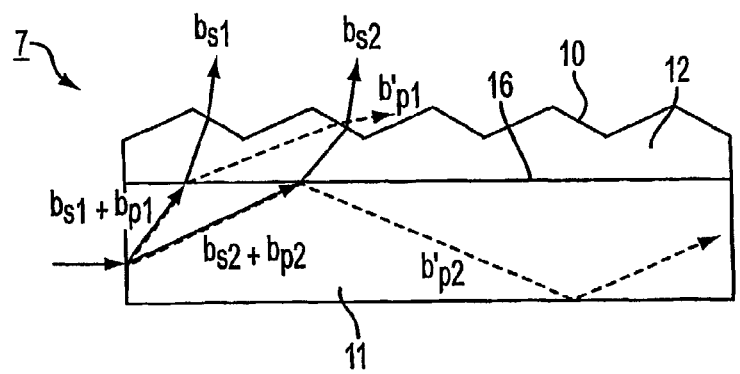
FIG. 2 is a cross-section of an embodiment of a polarizing device according to the present invention, in which illustrative paths of the incident light beam are illustrated.
Figure 3:
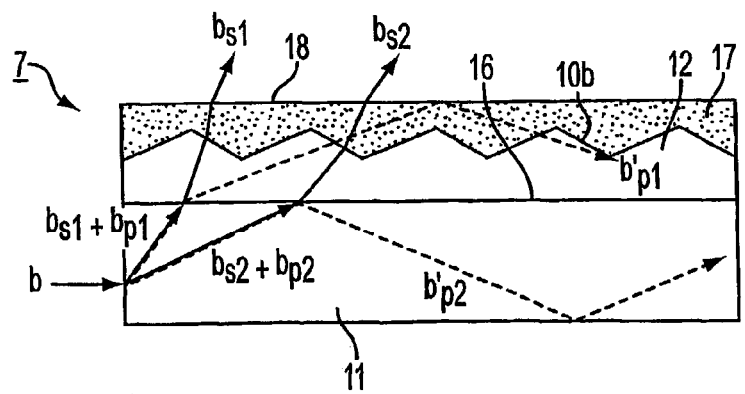
FIG. 3 is a cross-section of an embodiment of a polarizing device according to the present invention, in which illustrative paths of the incident light beam are illustrated.

FIG. 2 illustrates the radiation path in a polarizing device according to the invention 7. An example of the light polarization by a polarizing device according to the present invention 7 will be described according to FIG. 2 and the embodiment where the waveguiding layer 11 is optically isotropic and the separating layer 12 is optically anisotropic having one of the refractive indices larger than the refractive index of the optically isotropic waveguiding layer 11 and the other refractive index smaller than the refractive index of the optically isotropic wave guiding layer 11. Such a separating layer 12 may be based on an oriented film having a relief structure, such as depicted in FIG. 4. When an unpolarized light beam b is coupled into the waveguiding layer 11, polarization separation will occur at the interface 16 due to the optical anisotropy of the separating layer 12. In fact, the incident unpolarized beam comprises two beam components $b_s$ and $b_p$. At the interface 16, the beam component with the direction of polarization perpendicular to the interface 16, in other words, the s-component, such as $b_{s1}$ or $b_{s2}$, will detect a positive refractive index difference, i.e. the refractive index in the separating layer is higher than in the waveguiding layer 11, and will refracted through the interface 16 bending towards the normal of said surface to the exit surface 10 of the polarizing device 7. On the exit surface 10, however, this beam component encounters a smaller refractive index. Without relief structure on the exit surface 10 of the separating layer 12, the angles of incidence may be larger than the critical angle for total internal reflection and, consequently, be reflected back into the system. On the other hand, in the case of a surface structured separating layer 12, as described in one of the embodiments of the present invention, the incidence angles can be highly decreased and, thus, a considerably part of this beam component is coupled out. The other beam component, the p-component, such as $b_{p1}$ or $b_{p2}$, detects a negative refractive index difference at the interface 16, i.e. the refractive index in the separating layer 12 is lower than in the waveguiding layer 11, and, provided that the angle of incidence of the p-component is larger than the critical angle for total internal reflection, will be reflected back at the interface 16 into the waveguiding layer 11 ($b'_{p2}$). By propagation in this layer, this beam component can be recycled by providing all end surfaces which are not used for either in- or out-coupling of light, such as end surfaces 9 and 14 with depolarizing reflectors, such as 13 and 15. The p-component will, however, be refracted through the interface 16 into the waveguiding layer 12 if the angle of incidence of smaller than the critical angle for total internal reflection ($b'_{p1}$). Having a surface structure in the separating layer 12, these rays, such as $b'_{p1}$, can finally exit the polarizing device 7, which will decrease the observed contrast between the two polarization components. In a specific embodiment illustrated in FIG. 3, this loss of contrast can be reduced by covering the surface structured separating layer 12 with an additional layer 17 with a refractive index matched with the lower refractive index of the optically anisotropic separating layer 12. The part of the p-component, such as $b'_{p1}$, which still penetrates the interface 16 into the separating layer 12, will not detect a relief structure at interface 10b. At the exit surface 18 which is preferably flat, hence, the angle of incidence of these light rays will be in most cases large enough to fulfill the condition for total internal reflection and will be reflected back into the polarizing device according to the present invention 7. The s-component, such as $b_{s1}$ or $b_{s2}$, will just be slightly influenced by this additional filter layer 17. Perfect separation of the two beam components will be achieved in this way, resulting in high contrast between the two polarization states.

EXAMPLES

The following examples are given as particular embodiments of the invention and to demonstrate the practice and advantages thereof. It is understood that the examples are given by way of illustration and are not intended to limit the specification or the claims that follow in any manner.

Example 1

A polarizing device was prepared in accordance with an embodiment of this invention. The device prepared was made up of an anisotropic separating layer and an isotropic waveguiding layer.

The separating layer was prepared by taking a tape of Poly(ethylene terephtalate), PET (ARNITE D02 300 from DSM N.V., Heerlen, The Netherlands) and uniaxially drawing the tape four times its original length at 85° C. Drawing of the tape was performed on a standard tensile testing apparatus equipped with a thermostatically controlled oven. The refractive indices of the drawn tape were then measured using an Abbe refractometer. The refractive indices were 1.671 in the drawing direction ($n_e$) and 1.546 in the direction perpendicular thereto ($n_o$).

The drawn tape was then embossed on one side to provide the desired relief structure. Embossing was carried out using a silicon-based master. The silicon-based master used was a TGG01 calibration grating with a 9 mm$^2$ surface area and a zig-zag line geometry (obtained from NT-MTD, Moscow, Russia). The drawn tape was place on a glass plate already heated to 90° C. in a Tribotrak pressing apparatus, DACA Instruments, Santa Barbara, Calif. The Tribotrak apparatus permits the drawn tape to be heated from both the top and the bottom. Next, the tape was fixed to the glass plate so that the tape would not contract due to the application of heat. Next, the master was placed on top of the fixed tape. A second preheated plate at 90° C. was placed on top of the master and a pressure of 830 g/mm$^2$ was applied for 1 hour to the fixed tape sandwich by placing 7.5 kg of weights on top of the second heating plate. After 1 hour, heating was stopped and the fixed taped was allowed to cool down to room temperature with pressure still being applied to the master, tape, glass plate sandwich. Thereafter, the tape was removed from the Tribotrak apparatus and the geometry of the master surface was now embossed on one side of the drawn tape.

The isotropic waveguide selected for use was a 1 mm thick polycarbonate (PC) sheet purchased from General Electric (LEXAN®, optical grade). The PC sheet had a refractive index of 1.570. The PC sheet was cut into a 25 cm$^2$ piece and the edges of the sheet were polished to prevent light scattering causing undesired out-coupling of light. The polishing was carried out using a rotating plate with disc-shaped abrasive paper fixed to it. First, a WS-Flex-18-C abrasive paper (P 800) and, then, a finer abrasive paper (P 1200) (both Hermes Abrasives, Ltd.) were used. Polishing was continued until optically smooth surfaces were obtained.

Figure 10:
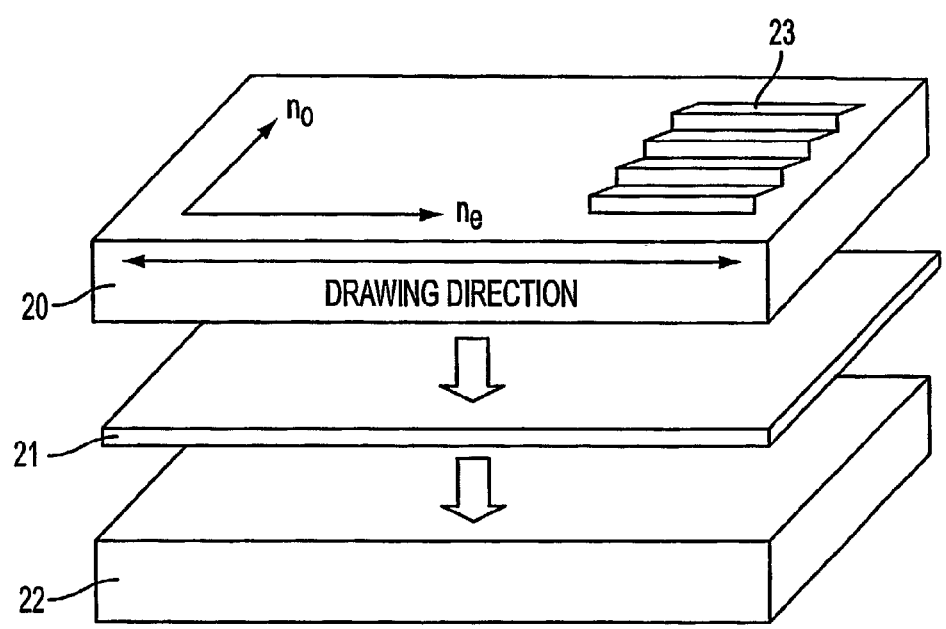
FIG. 10 shows a schematic drawing of the preparation of a polarizing device according to Example 1.

The polarizing device was prepared by adhering a 2 cm by 0.5 cm piece of the drawn and embossed PET tape to the surface of the 25 cm$^2$ PC sheet, using a UV-curable acrylate mixture. The acrylate mixture consisted of a mixture of bisphenol A ethoxylate (1 EO/phenol) diacrylate and tri (propylene glycol) diacrylate both purchased from the Aldrich fine chemical company. In addition, 1-hydroxycyclohexyl phenyl ketone initiator (HCPK, purchased from Aldrich) was added to the above acrylic mixture at 0.5% wt. First, a thin layer of this UV curable acrylate mixture 21, which had a refractive index of 1.569 after curing as was measured using an Abbe refractometer, was applied to the surface of the PC sheet. Next the embossed PET tape 20 was placed on top of the sheet such that the embossed surface 23 of the PET tape was facing away from the surface of the PC sheet 22, as illustrated in FIG. 10. Thereafter, the acrylate mixture was cured for 5 minutes under UV-lamps (Philips CLEO 15W, UV type 3).

Next the polarizing device prepared above was measured with an Eldim EZContrast 160P measuring system (ELDIM SA., Hérouville Saint Clair, France). This testing apparatus permits measurements of light including both its intensity and three-dimensional distribution as the light exits the polarizing device being tested.

Figure 9:
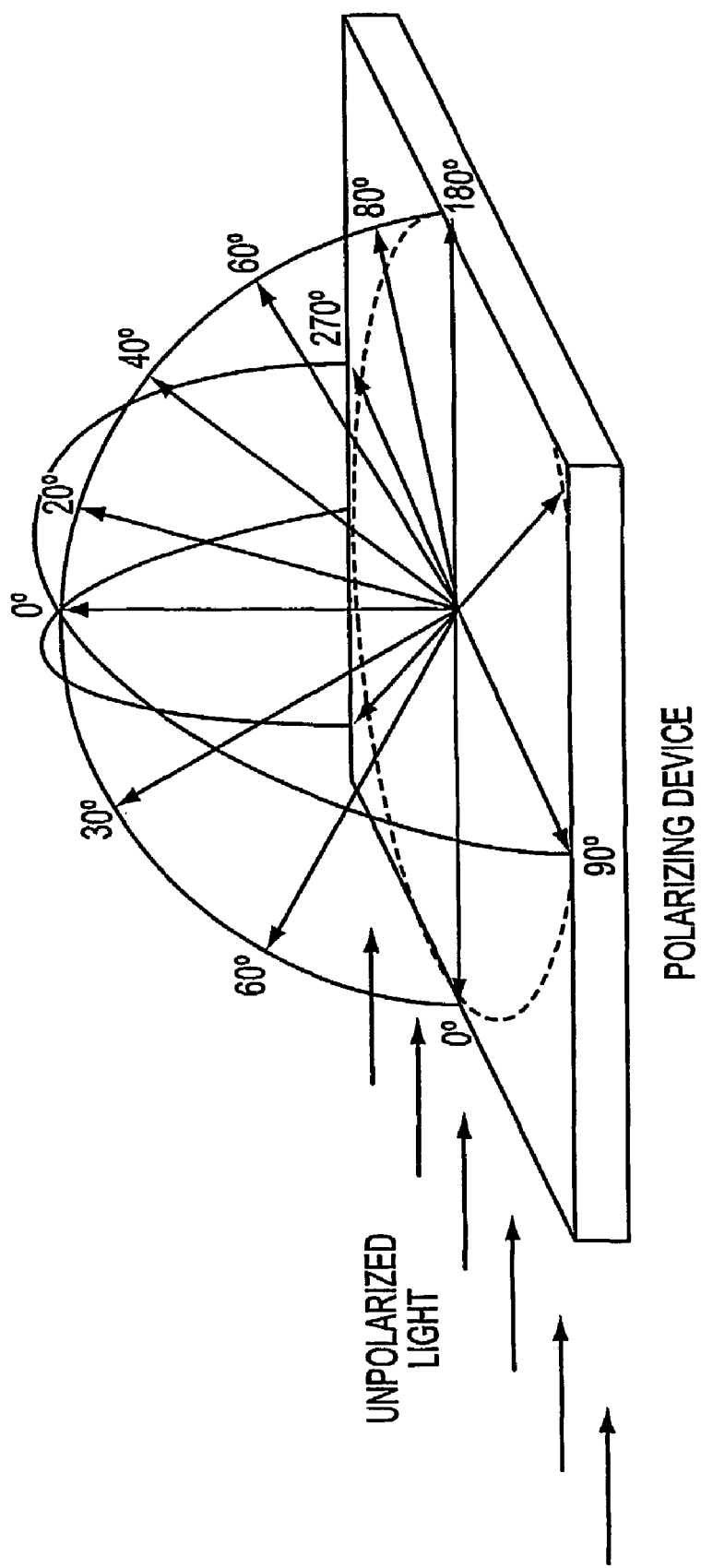
FIG. 9 shows a schematic drawing of the light intensity and three-dimensional distribution measurement set-up.

The polarizing device was placed in a sample holder of the testing apparatus such that the embossed surface of the device was facing the testing apparatus' detector. Next, uncollimated, unpolarized white light was injected into one side face of the polarizing device, as schematically shown in FIG. 9. This side face was parallel to the grooves of the embossed relief structure of the PET tape. Both the s-component and the p-component of the polarizing device were measured. The s-component was measured by placing the polarizing device in the testing apparatus' holder such that embossed grating of the device was parallel to the polarization direction of the polarizer of the testing apparatus. The p-component was measured by rotating the polarizer of the testing apparatus 90°. The contrast was obtained by dividing the measurements of the s-component by the measurements of the p-component. These results are depicted in FIG. 6.

Figure 6:
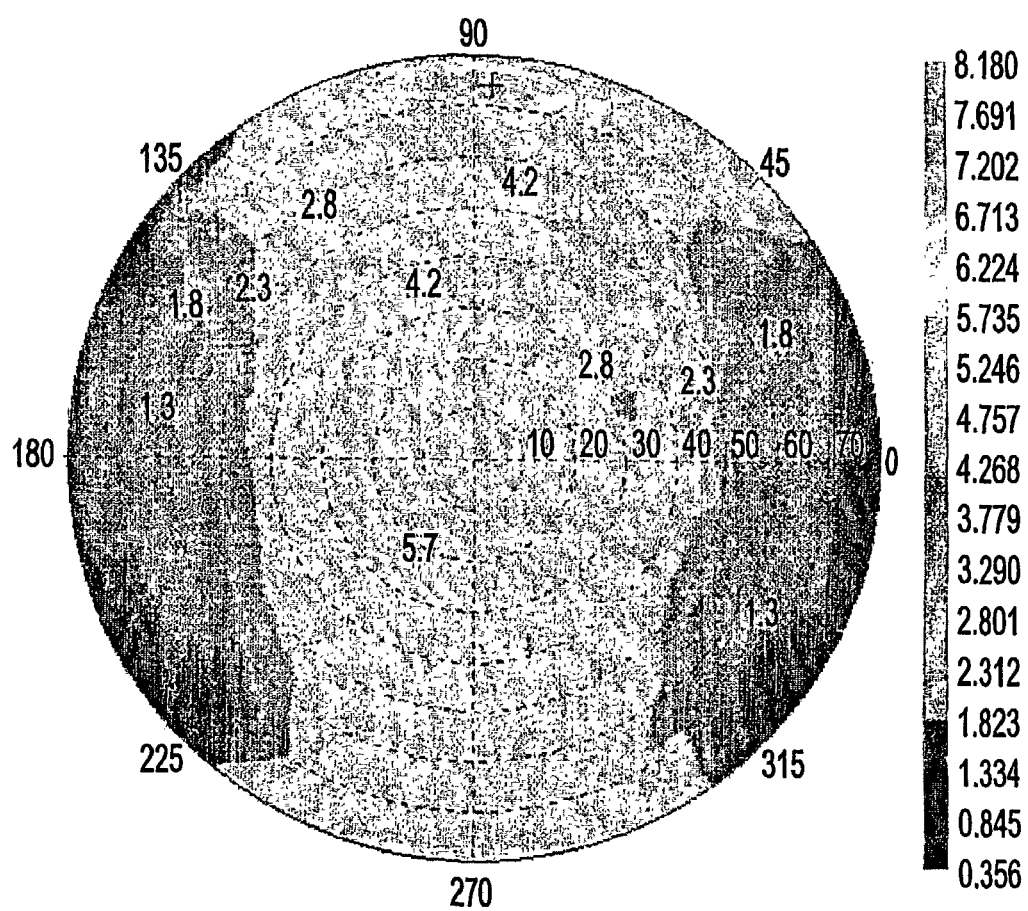
FIG. 6 shows the measured contrast between the s-component and the p-component of the light emitted in Example 1.

As can be seen in FIG. 6, the polarizing device of this example emits polarized light in a direction fairly perpendicular to the surface of the polarizing device with a contrast of up to 5.7. An overall contrast over the whole measuring area of 1.44 was measured. Accordingly, the device of Example 1, wherein the isotropic waveguiding layer possessed a refractive index of the (1.570) which was in between the two refractive indices of the anisotropic separating layer, produced polarized light without the need of matching one of the refractive indices of the anisotropic separating layer as disclosed in U.S. Pat. No. 5,845,035.

Example 2

A second sample was prepared in the same way as in Example 1, but now an additional isotropic layer was provided on top of the embossed PET tape. To provide an additional isotropic layer, a drop of a UV curable acrylate mixture, which had a refractive index of 1.545 after curing as was measured using an Abbe refractomer, was applied onto the embossed relief structure of the PET tape of example 1. As in example 1, this acrylate mixture consisted of bisphenol A ethoxylate (1 EO/phenol) diacrylate, tri(propylene glycol) diacrylate and 0.5 wt. % 1-hydroxycyclohexyl phenyl ketone, where the amounts of the diacrylates used were adjusted to provide a refractive index of 1.545 after curing.

A piece of Mylar® polyester film (E. I. du Pont de Nemours and Company) was placed on top of the acrylate droplet and slightly pressed onto the acrylate-covered PET tape in order to get a flat top surface for this additional acrylate layer. Thereafter, the additional acrylate layer was glued to the embossed PET tape by curing for 5 minutes under UV-lamps (Philips CLEO 15W, UV type 3). Accordingly, this isotropic layer had a refractive index substantially equal to the lower refractive index (1.546) of the anisotropic layer. Next, the Mylar® film was removed.

The performance of the polarizing device prepared in this way was measured as described in Example 1. The results are depicted in FIG. 7.

Figure 7:
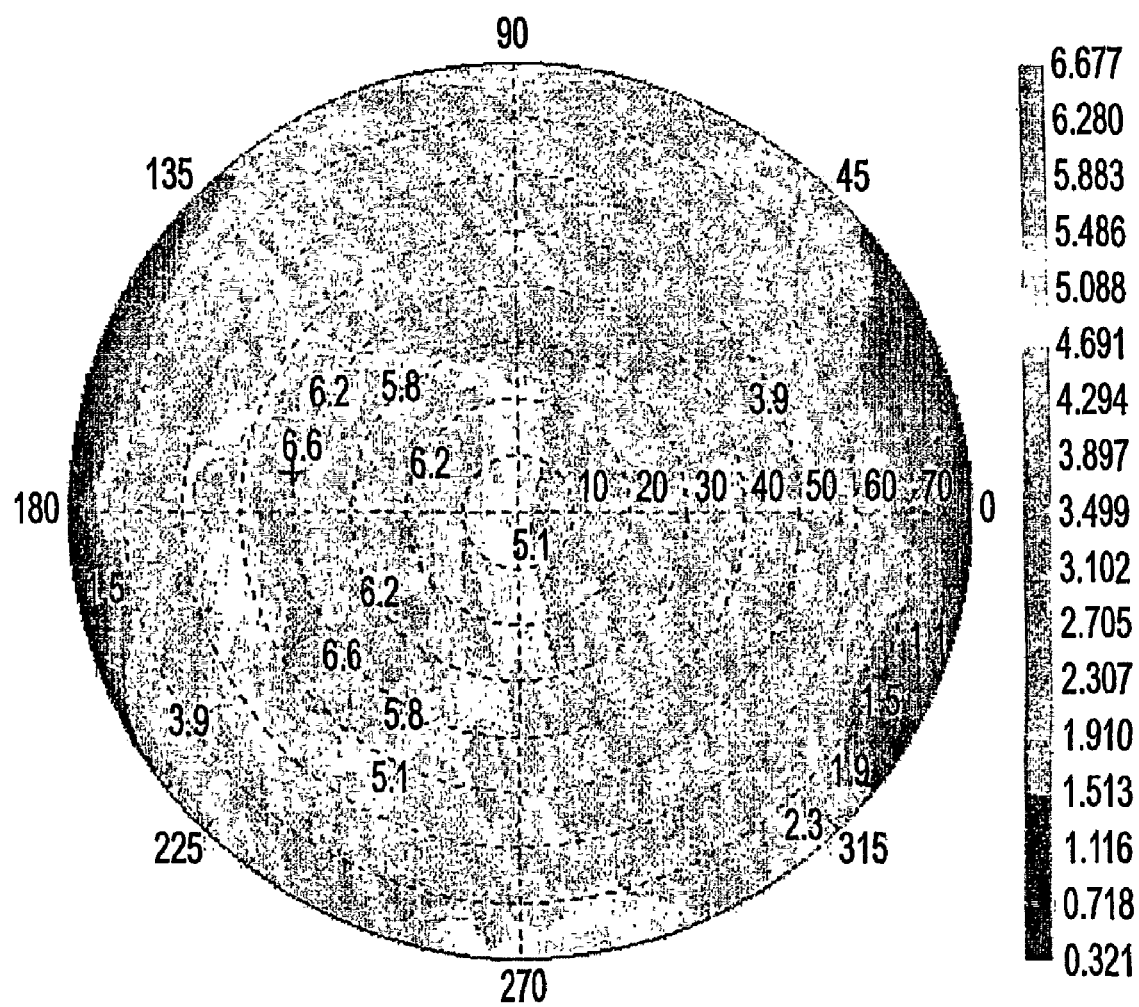
FIG. 7 shows the measured contrast between the s-component and the p-component of the light emitted in Example 2.

As can be seen in FIG. 7, the polarizing device of this example emits polarized light in a direction fairly perpendicular to the surface of the polarizing device with a contrast of up to 6.6. More importantly, an overall contrast over the whole measuring area of 3.3 was obtained. Accordingly, the additional isotropic layer, as can be seen by comparing this Example with Example 1, thus increased the contrast of the polarizing device.

Example 3

An unembossed PET tape, which had no embossed relief structure, was used to prepare a third sample analogous to the procedure used to prepare Example 1. The performance of the polarizing device prepared in this way was measured as described in example 1. The results are depicted in FIG. 8.

Figure 8:
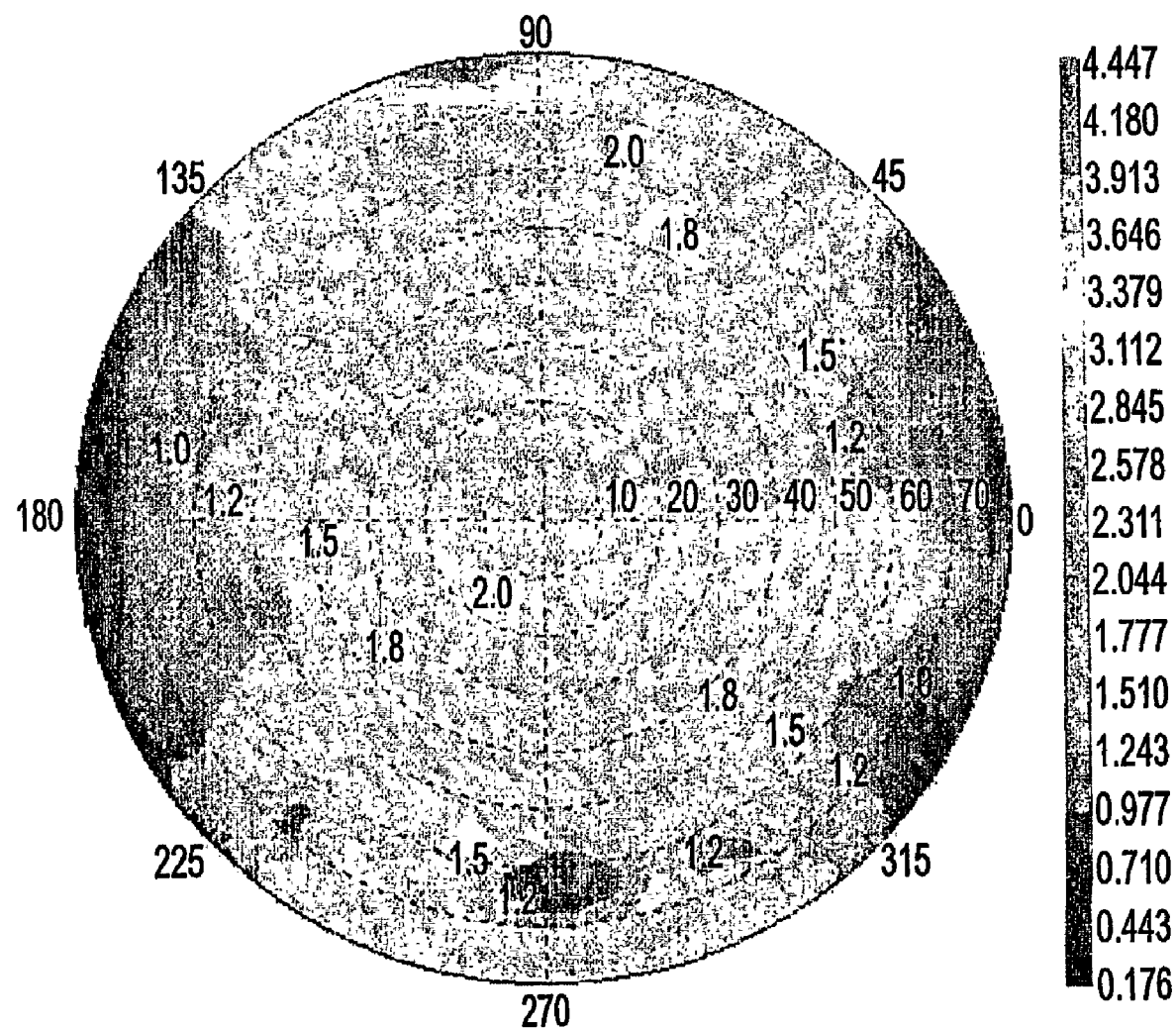
FIG. 8 shows the measured contrast between the s-component and the p-component of the light emitted in Example 3.

As can be seen in FIG. 8, the polarizing device of this example emits polarized light in a direction fairly perpendicular to the surface of the polarizing device with a contrast of up to 2.0. Additionally, it was observed that the light was predominately waveguiding to the endfaces of the polarizing device. Accordingly, the device of Example 3, wherein the refractive index of the isotropic waveguiding layer (1.570) was in between the two refractive indices of the anisotropic separating layer, without using a light out-coupling means, such as a embossed relief structure, produced very moderately polarized light with a low yield. Thus, this example illustrates that it is desirable to have a light out-coupling means, such as an embossed relief structure, on the stretched PET tape for obtaining an efficient polarizing device.

Example 4

Another sample was prepared in the same way as in Example 1, but now with a waveguide made of optical quality PS (100 mm×100 mm plates with a thickness of 1.2 mm, purchased from Goodfellow, UK) instead of PC. Also a different glue (Cargille Meltmount™, refractive index 1.662, purchased from Electron Microscopy Science, Fort Washington, Pa., USA) was selected that matches the refractive index of the PS used.

Figure 11:
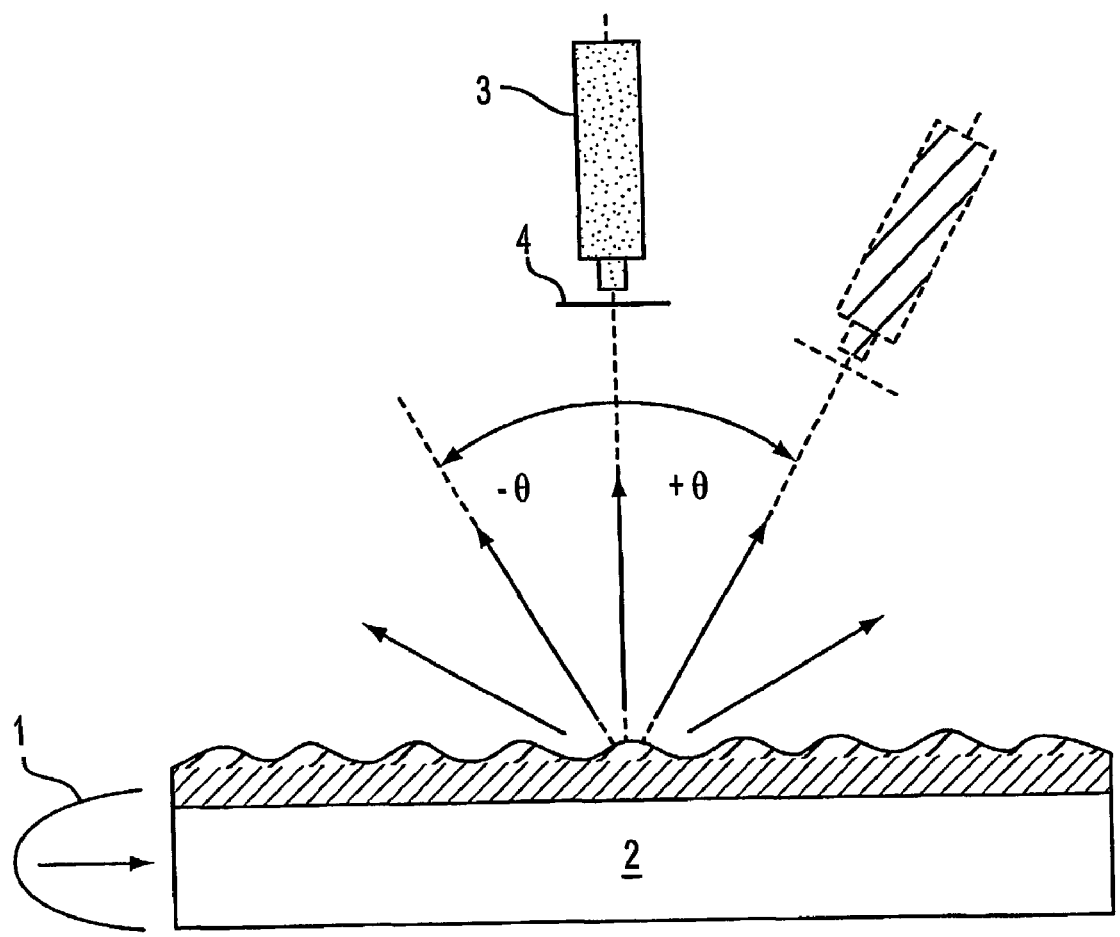
FIG. 11 shows a schematic drawing of the light intensity and two-dimensional distribution measurement set-up: (1) light source, (2) polarizing device, (3) light detector, and (4) analyzer.

Angular intensity distributions of the out-coupled light of the polarizing devices were measured with a DMS 703 (autronic-MELCHERS GmbH, Germany) equipped with a photometric detector (spot size: 200 $\mu$m). A schematic drawing of the measurement set-up is presented in FIG. 11. Samples (2) were illuminated from the side with a halogen-light source (1). For certain measurements, a poly(methyl methacrylate) (PMMA) wedge was used to collimate the light input. A standard dichroic polarizer (4) was placed in front of the light detector (3) with its polarization direction parallel or perpendicular to the orientation direction of the PET top layer of the polarizing devices. The detector was connected to a photomultiplier tube to measure the intensity of the light emitted from the system. The former could be rotated in a vertical plane over an inclination angle, $\theta$, ranging from $-70°$ to $+70°$. The samples themselves were mounted onto a holder, which could be rotated horizontally. In this particular study, the two-dimensional (polarized) light output perpendicular to the embossed grooves was recorded ($\theta=-70°$ to $+70$). Note that negative inclination angles represent light coupled-out of the system in direction towards the light source.

Figure 12A:
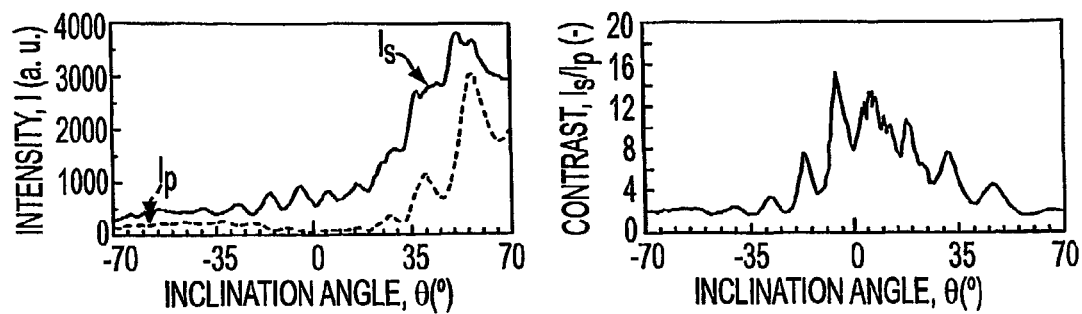
FIGS. 12(a) and (b) show the measured intensities ($I_p$ and $I_s$) for exiting p and s polarized light, and the contrast between the s-component and the p-component of the emitted light in Example 4, for uncollimated (a) and collimated (b) light input.

The two-dimensional intensity distribution (perpendicular to the embossed grooves; inclination angles, $\theta=-70°$ to $+70°$) of polarized light coupled-out of the system is plotted in FIG. 12a (left panel) for both the bright (s-polarized; $I_s$) and the dark state (p-polarized; $I_p$). A large contrast in light intensity ($I_s/I_p$>10) is observed for $\theta$ ranging from about $-10°$ to $+20°$ (FIG. 12a, right panel) with a maximum contrast ratio that exceeds 14.

In addition, measurements with a collimated light input were performed on the embossed PET/a-PS systems. The use of collimated light (small α) may yield enhanced contrast, as the probability is increased that at the interface PET/a-PS, the condition $\phi_i > \phi_c$ is fulfilled for all p-polarized light rays (the undesired light component). Therefore, the p-polarized light will to a considerable extent be reflected back into the isotropic a-PS sheet. Simultaneously, however, the intensity of the light output might be reduced, when compared to measurements with uncollimated light (large α). Indeed, utilizing a poly(methyl methacrylate) wedge to collimate the light incident into the system, dramatically increased contrast ratios were observed over the entire θ-range, but as anticipated at lower light output. As different detection parameters (e.g. higher gains for the detector) were applied to increase the sensitivity, the intensity values obtained can not directly be compared with measurements recorded without light collimation. The contrast ratios, though, should not be affected by this change. Results obtained utilizing collimated light input are presented in FIG. 12b. In the θ-range between −10° to +10° very low p-intensity values were measured leading to contrast ratios $I_s/I_p$ that exceed 80. It would appear that an average value of around 40 would be a more realistic average, since the $I_p$ values were close to the detection limit of the equipment (despite higher detector gain) and, as a result, of relatively high noise.

Nevertheless, contrast ratios of over 20 were measured in the θ-regime of −20° to +15°, and of over 10 even for high inclination angles of −25°<θ; +20°<θ. The latter characteristics appear to be highly promising when bearing in mind that a contrast around 10 is sufficient for many applications. For applications requiring higher contrast ratios, a conventional "clean-up" polarizer can easily be employed without significant losses in light intensity.

Figure 12B:
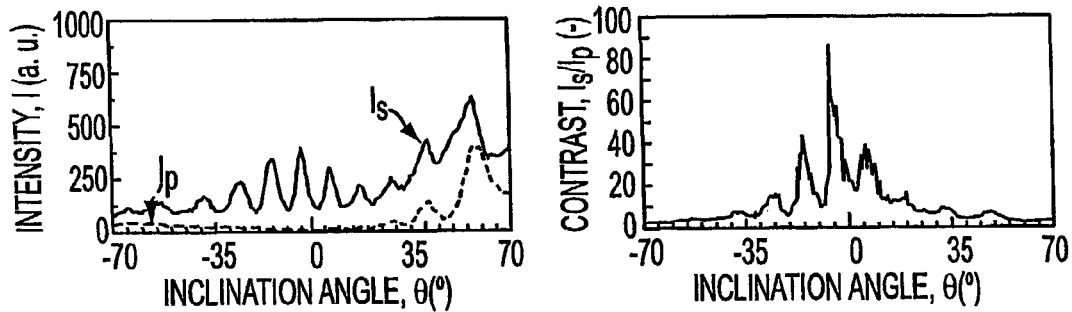

It should be noted that for the bright state (s-polarization) of polarizing devices comprised of embossed PET films on top of a-PS sheets, the light output as function of inclination angle exhibited a sinusoidal behavior for both uncollimated (FIG. 12a, left panel) and, most distinctly, for collimated light input (FIG. 12b, left panel). These observations indicate that the phenomenon is likely to originate from light diffraction effects: the embossed microstructured PET layer, obviously, acts as diffraction grating for light in the visible wavelength. Clearly, out-coupling structures that do not diffract visible light (i.e. which are of dimensions much larger than the wavelength of light used) should further display enhanced performance, in particular with respect to brightness.

Finally, a systematic anisotropy can be observed in all three measured light intensity distributions in FIG. 12: for θ>+40°, distinctively higher values were measured than for θ<−40°. This feature can be at least partly attributed to the fact that no depolarizing mirrors were attached to the end-faces of the present polarizing devices, and higher leakage of light directed away from the light source is thus expected. Of course, providing the end-faces of the polarizing devices with depolarizing mirrors and/or using more than one light source at various sides of the system will reduce this effect. Importantly, however, it appears that this phenomenon may be circumvented also by utilizing an out-coupling surface structure with a gradient of the fill factor and/or geometry along the light input direction which, ultimately, can be designed to yield a (more) homogeneous light emission of one polarization direction.

Additionally, this example demonstrates that a wide range of materials combinations can be applied in the concept of the present invention.

Example 5

A fifth example describes how an isotropic waveguiding layer and an anisotropic polarization separating layer is produced using a standard injection molding process, using inexpensive bulk polymers. Injection molding is widely known as a cost-effective method of producing complex shaped polymer articles.

First, both an isotropic PMMA waveguiding layer and a PS separating layer with a sub-micron structure at the bottom and a light out-coupling structure at the exit surface (for a schematic drawing, see FIG. 5), are produced using the injection molding technique. In the injection molding process, a liquid resin is injected into a molding cavity where it is left to cool and solidify for a predetermined time, after which the molded plastic substrate is ejected, for example, by a mechanical ejector ring. There are many methods and parameters that will vary depending on the materials used. One skilled in the art can select and optimize those parameters such that an acceptable injection molded structure is obtained.

The materials used are high purity grade PMMA and PS that are commercially available from various suppliers, such as Rohm and Haas company. The injection molding machine is a standard machine like an Arburg Allrounder 750-210-320 D fitted with a 25 mm screw. The PMMA and PS layers are then connected with an acrylate glue of which the refractive index matches that of PMMA. Isotropic PMMA has a refractive index of 1.491, and isotropic PS has a refractive index of 1.594 (both for green light). The sub-micron structure 12b will exhibit form birefringence, the magnitude of which can be estimated with the so-called effective medium theory (EMT, Born and Wolf, Principles of Optics, page 705–708).

For a rectangular grating it can readily be calculated that at a fill-factor of 0.86 (thickness of one PS rectangular divided by the total pitch length), the total birefringence will be 0.07. The refractive index of PMMA will be in between the refractive index along the grooves (about 1.45) and perpendicular to the grooves (about 1.53). Of course, also other fill-factors or grating geometries may be used, provided the refractive index of PMMA is in between the high and low refractive index of the PS form birefringent layer. In all cases, however, the maximum grating dimension (in case of a rectangular grating, the largest of 17 and 18 in FIG. 5 is preferably below 400 nm and more preferably below 300 nm, and most preferred below 200 nm. Moreover, in all cases, the depth of the grating (in case of a rectangular grating, 19 in FIG. 5 is preferably larger than 500 nm, more preferably larger than 800 nm, and most preferred larger than 1 micrometer. The PS form birefringent layer on top of the PMMA waveguiding layer acts as a polarization separating sheet, in the same way as the previous examples. Light which travels through the PMMA layer and hits the interface and which is polarized parallel to the grooves experiences a lower refractive index and undergoes total internal reflection provided the angle of incidence is small enough. The polarization direction of this light is changed by a depolarizing mirror at the bottom or the end face of the PMMA waveguiding layer, after which it is re-introduced at the interface. Light polarized perpendicular to the grooves experiences a higher refractive index and partly refracts into the grating, from where it refracts into the even higher refractive index PS region. Finally, the structure on the exit surface couples the light out.

Example 6

A sixth example can be prepared with injection molding in the same way as the previous sample, but now the highest reflective index of the form birefringent layer is substantial equal to that of the isotropic PMMA waveguiding layer. Using the effective medium theory, this is expected to happen at a fill-factor of 0.79 for a rectangular grating. This example illustrates that a standard, cheap bulk polymer can be used for the waveguiding layer with a refractive index matched to one of the refractive indices of the form birefringent separating layer. In comparison to U.S. Pat. No. 5,845,035, it is shown that a efficient polarizing device can be produced without the need for highly exotic, non-commercial and expensive high refractive index polymers for the waveguiding layer. Moreover, a highly reproducible, cost-effective production technique is used, without the need to use expensive film technology.

Figure 13:
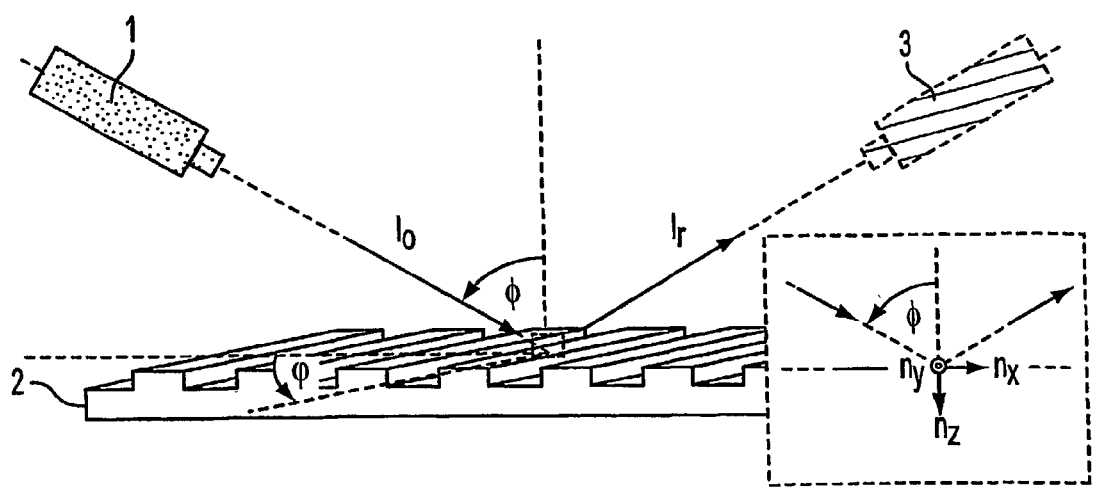
FIG. 13 shows the experimental set-up used to assess the reflectivity behavior of a rectangularly modulated PS grating of periodicity $\Lambda$, line width a, and pitch height h: (1) light source, (2) PS sample, and (3) detector. For the mathematical description of the reflection behavior utilizing generalized Fresnel equations, two mutually orthogonal axes x and y were defined, that are in the ambient/grating interface parallel and perpendicular to the plane of incidence, and a z axis, which lies perpendicular to the interface (inset).

To demonstrate that a microstructured PS surface will act as a birefringent mirror (also under oblique angles), the dependence of optical characteristics on the incidence angle of light was analyzed of transparent atactic polystyrene films that were embossed (5 min. at a temperature of 180° C. and a load of 300 g/mm$^2$), with a submicron grating of periodicity, $\Lambda$=270 nm, pitch height, h≈100 nm and fill factor, f=0.5 (purchased from CSEM, Switzerland), in light-reflection measurements utilizing the experimental set-up depicted in FIG. 13. The reflectance R of light impinging such surfaces was recorded at various incidence angles $\phi$ and sample orientations $\phi$ (R is defined as the ratio of the reflected light intensity $I_r$, to the incoming light intensity $I_0$).

Figure 14A:
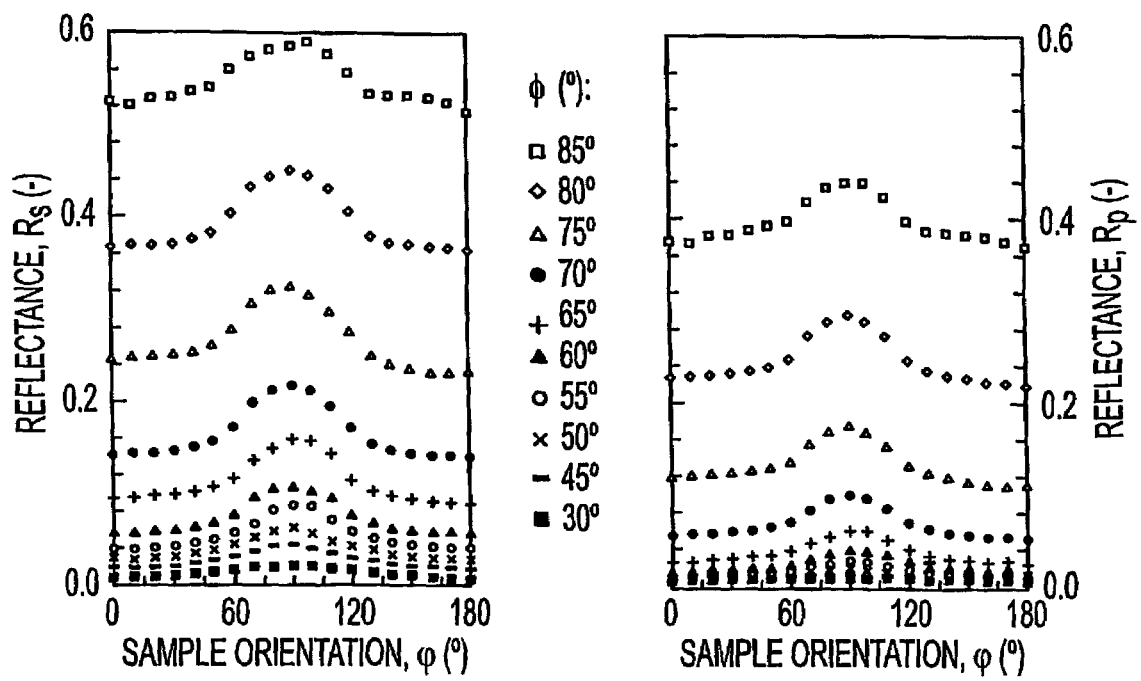
FIG. 14 shows optical characteristics of an a-PS film comprising a surface grating of periodicity, $\Lambda=270$ nm, line width, a=135 nm (fill factor=0.5), and pitch height, h≈100 nm. (a) Reflectance of light polarized perpendicular to the plane of incidence ($R_s$; left panel), respectively, parallel to it ($R_p$; right panel) as a function of the sample orientation, $\phi$, for various incident angles, $\phi$. (b) Comparison of the reflectance behavior of light incident at 60° on such a structured a-PS film, with an unstructured reference film. $R_s$ (▲) and $R_p$ (■) of the surface structured film displayed a periodic dependence with sample orientation, whereas $R_s$ (△) and $R_p$ (□) of the reference sample were independent of it.
Figure 14B:
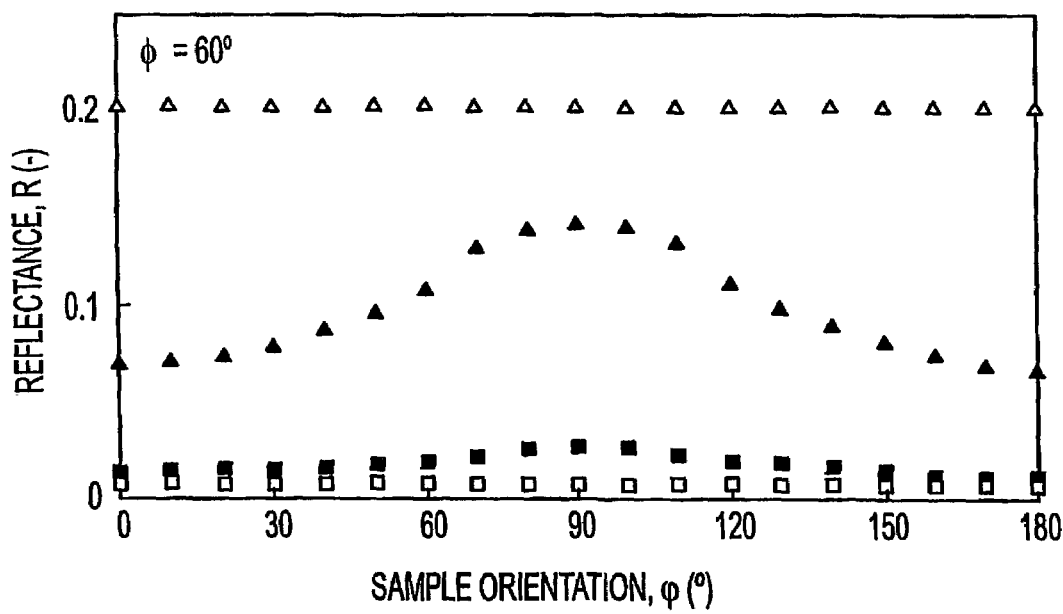

In a first set of experiments, the reflectance of s- and p-polarized light, $R_s$ respectively $R_p$, were measured as function of sample orientation. On surface-structured a-PS films, both $R_s$ and $R_p$ exhibited a periodic dependence on $\phi$ for all incidence angles tested (FIG. 14a). On the other hand, for the reference samples (unstructured a-PS films), a constant value was recorded (FIG. 14b; displayed is the result of a measurement conducted at $\phi$=60°). These observations clearly indicate the particularly beneficial anisotropic reflectivity behavior of submicron-structured a-PS gratings according to the present invention, even for light incident onto the surface structure at high angles.

Figure 15A:
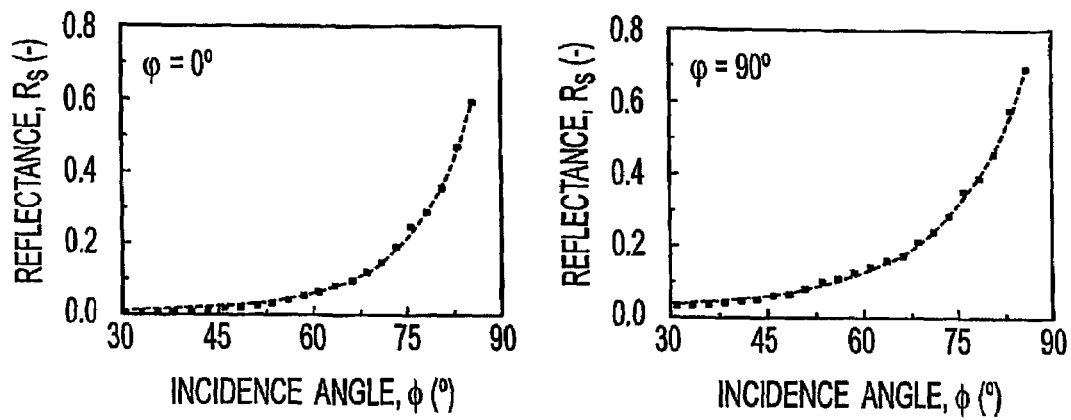
FIG. 15 shows the measured and curved-fitted reflectance as a function of the incidence angle $\phi$ of the same nanostructured a-PS film as in FIG. 14, employed to quantify the optical characteristics of the latter. Two particular sample orientations, $\phi=0°$ and $\phi=90°$ (embossed submicron grooves parallel, respectively, perpendicular to plane of incidence of the incoming light) were analyzed. (a) $R_s$ could accurately be curve-fitted (solid line) for $n_0=1.0$. Resultant values for the effective indices of the atactic polystyrene grating of $n_{//}=1.36$ and $n_\perp=1.21$ are in good agreement with values predicted by the effective medium theory (EMT) (for f=0.5, $n_1=1.59$ and $n_2=1.0$: $n_{//}\approx1.33$, $n_\perp\approx1.20$). (b) For $R_p$, calculations were performed for two different $n_z$ values: 1.59 (solid line) and 1.40 (dotted line).
Figure 15B:
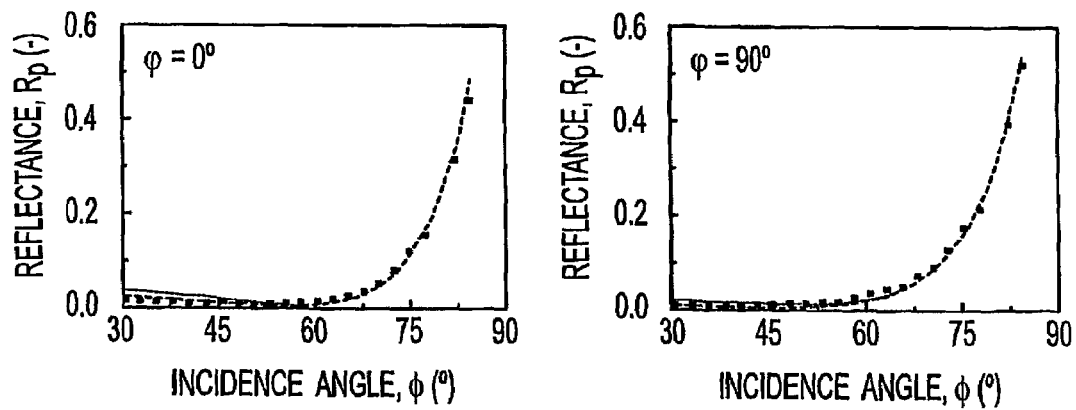

In order to quantify the birefringence of the surface-structured a-PS films, in a second set of experiments the reflectance was recorded as function of $\phi$ for two particular sample orientations, $\phi$=0° and $\phi$=90° (embossed submicron grooves parallel, respectively, perpendicular to plane of incidence of the incoming light), again for both incoming s-polarized (FIG. 15a) and p-polarized light (FIG. 15b).

Generalized Fresnel equations were applied to estimate the two refractive indices of the form-birefringent a-PS gratings by curve-fitting the experimental data. For light incident from an isotropic medium of refractive index $n_0$ onto a biaxially anisotropic film that is positioned such that two of the three principal optical axes (x and y) lie parallel to the ambient-grating interface, while the third (z) is perpendicular to it (FIG. 13, inset), the reflection coefficients, $r_s$ and $r_p$, are given by (Azzam, R. M. A. & Bashara, N. M. *Ellipsometry and Polarized Light,* North-Holland Publishing Company, Amsterdam, 1977, Ch. 4.):

$$r_s = \sqrt{R_s} = \frac{n_0\cos\phi - \sqrt{n_y^2 - n_0^2\sin^2\phi}}{n_0\cos\phi + n_0\sqrt{n_y^2 - n_0^2\sin^2\phi}}$$

$$r_p = \sqrt{R_p} = \frac{n_x n_z\cos\phi - n_0\sqrt{n_z^2 - n_0^2\sin^2\phi}}{n_x n_z\cos\phi + n_0\sqrt{n_z^2 - n_0^2\sin^2\phi}}$$

Curve-fitting of $R_s$ for the two selected sample positions ($\phi$=0° and 90°; FIG. 15a) resulted in values for $n_{//}$ and $n_\perp$ of 1.36 and 1.21 ($n_0$=1.0), which are in satisfactory agreement with values predicted with the approximative EMT (for f=0.5, $n_1$=1.59 and $n_2$=1.0: $n_{//}$≈1.33, $n_\perp$≈1.20). Curve-fitting of $R_p$ was performed keeping $n_z$ constant (the actual value of which was not known). Calculations for two values of $n_z$ (1.59 and 1.40) are displayed in FIG. 15b (dotted and solid line, respectively).

Therefore, it appears that in polarized-light-emitting polarizing devices, such as those discussed in this and previous examples, polymer layers with a submicron surface structure in the bottom surface and a relief structure of larger dimensions (ideally>> than the wavelength of light used) in the top surface, combined with an isotropic waveguide, might be employed as polarization-selective mirrors. Furthermore, simple EMT seems to be applicable for initial device design.

Having described specific embodiments of the present invention, it will be understood that many modifications thereof will readily appear or may be suggested to those skilled in the art, and it is intended therefore that this invention is limited only by the spirit and scope of the following claims.

What is claimed is:

1. A polarization device comprising:
   an optically transparent waveguiding layer; and
   an optically transparent separating layer;
   wherein said separating layer comprises a form birefringent region having principal refractive indices $n_x$ and $n_y$, and
   wherein said form birefringent region is a layer with a sub-micron grating.

2. The device of claim 1, wherein said waveguiding layer is an isotropic layer having a refractive index $n_i$.

3. The device of claim 1, wherein said separating layer further comprises an isotropic region having a refractive index $n_s$.

4. The device of claim 3, wherein $n_s > n_x \geq n_i > n_y$.

5. The device of claim 1, wherein said grating is rectangularly shaped.

6. The device of claim 1, wherein said separating layer comprises an out-coupling means.

7. The device of claim 6, wherein said separating layer comprises an out-coupling means comprising a relief structure.

8. The device of claim 7, wherein said relief structure collimates light.

9. The device of claim 1, wherein said waveguiding layer comprises poly(methyl methacrylate).

10. The device of claim 1, wherein said separating layer comprises polystyrene.

11. An illumination system comprising the device of claim 1.

12. A flat panel picture display comprising the illumination system of claim 11.

13. A method for making the device according to claim 1, comprising: forming said birefringent region by injection molding.

14. A polarizing device comprising an optical waveguide comprising:
- a separating layer comprising a first optically transparent anisotropic region having principal refractive indices $n_x$ and $n_y$, wherein $n_x$ is greater than $n_y$;
- a waveguiding layer comprising a second optically transparent anisotropic region having principal refractive indices $n_a$ and $n_b$, wherein $n_a$ is greater than $n_b$; and
- wherein at least one of $n_a$ and $n_b$ is substantially different from $n_x$ and from $n_y$.

15. The device of claim 14, wherein said principal refractive indices $n_x$ and $n_y$ are refractive indices in a plane parallel to the interface between said separating layer and waveguiding layer.

16. The device of claim 15, wherein said principal refractive indices $n_a$ and $n_b$ are refractive indices in a plane parallel to the interface between said separating layer and waveguiding layer.

17. The device of claim 16, wherein $n_a$ is larger than $n_x$ and larger than $n_y$, and wherein $n_b$ is smaller than $n_x$ and smaller than $n_y$.

18. The device of claim 16, wherein said refractive index $n_a$ has the same direction as said principal refractive index $n_x$.

19. The device of claim 18, wherein $n_a$ is greater than $n_x$ and wherein $n_b$ is smaller than $n_y$.

20. The device of claim 18, wherein $n_a$ is smaller than $n_x$ and $n_b$ is greater than $n_y$.

21. The device of claim 16, wherein said principal refractive index $n_a$ has the same direction as said principal refractive index $n_y$.

22. The device of claim 21, wherein said refractive index $n_a$ is greater than said refractive index $n_y$, and wherein said refractive index $n_b$ is smaller than said refractive index $n_x$.

23. The device of claim 21, wherein said refractive index $n_a$ is smaller than said refractive index $n_y$, and wherein said refractive index $n_b$ is greater than said refractive index $n_x$.

24. The device of claim 14, wherein said waveguiding layer consists of said second anisotropic region.

25. The device of claim 14, wherein said separating layer comprises a form birefringent region.

26. An illumination system comprising the device of claim 14.

27. A flat panel picture display comprising the illumination system of claim 26.

28. A polarizing device comprising:
- an optically transparent isotropic waveguiding first layer having a refractive index $n_i$;
- an optically transparent anisotropic separating layer having principal refractive indices $n_x$ and $n_y$, wherein $n_x$ is greater than $n_y$;
- an optically transparent third layer having a refractive index $n_t$;
- wherein said separating layer comprise an light out-coupling means; and wherein said third layer is provided on top of said light out-coupling means.

29. The device of claim 28, wherein said refractive index $n_t$ is substantially equal to said refractive index $n_y$.

30. The device of claim 28, wherein the surface of said third layer that is facing away from said light out-coupling means is a flat surface.

31. The device of claim 28, wherein said third layer is an acrylic layer.

32. An illumination system comprising the device of claim 28.

33. A flat panel picture display comprising the illumination system of claim 32.

34. A polarizing device comprising:
- an waveguiding isotropic first layer;
- an anisotropic layer, said anisotropic layer being provided on said first layer, said anisotropic layer having a patterned surface; and
- an isotropic second layer provided on said anisotropic layer.

35. The polarizing device of claim 34, wherein said anisotropic layer is provided on said first layer with an adhesive.

36. The polarizing device of claim 34, wherein said anisotropic layer is a poly(ethylene terepthalate) layer.

37. The polarizing device of claim 34, wherein said patterned surface is provided by embossing.

38. The polarizing device of claim 34, wherein said third layer has a surface facing away from said patterned surface, and wherein said surface facing away from said patterned surface is a flat surface.

39. A liquid crystal display comprising the polarizing device of claim 34.

* * * * *